United States Patent
Gessler et al.

(10) Patent No.: US 10,259,041 B2
(45) Date of Patent: Apr. 16, 2019

(54) METHOD OF MANUFACTURING A THREE-DIMENSIONAL OBJECT HAVING AN INTERNAL STRUCTURE

(75) Inventors: Monika Gessler, München (DE);
Michael Jan Galba, München (DE);
Johann Oberhofer, Stockdorf (DE)

(73) Assignee: EOS GmbH Electro Optical Systems, Krailling (DE)

( * ) Notice: Subject to any disclaimer, the term of this patent is extended or adjusted under 35 U.S.C. 154(b) by 432 days.

(21) Appl. No.: 13/820,684

(22) PCT Filed: Sep. 5, 2011

(86) PCT No.: PCT/EP2011/065334
§ 371 (c)(1),
(2), (4) Date: Mar. 4, 2013

(87) PCT Pub. No.: WO2012/028747
PCT Pub. Date: Mar. 8, 2012

(65) Prior Publication Data
US 2013/0171019 A1    Jul. 4, 2013

Related U.S. Application Data

(60) Provisional application No. 61/393,659, filed on Oct. 15, 2010.

(30) Foreign Application Priority Data

Sep. 3, 2010  (DE) .................. 10 2010 040 261

(51) Int. Cl.
*B22F 3/00*   (2006.01)
*B29D 28/00*  (2006.01)
(Continued)

(52) U.S. Cl.
CPC ............ *B22F 3/008* (2013.01); *B29C 64/153* (2017.08); *B29C 64/20* (2017.08); *B29D 28/00* (2013.01);
(Continued)

(58) Field of Classification Search
CPC ..... B22F 3/008; B29C 67/0051; B33Y 80/00; B33Y 10/00
(Continued)

(56) References Cited

U.S. PATENT DOCUMENTS 6,630,093 B1 * 10/2003 Jones ........................... 264/401
6,792,327 B1    9/2004 Bamford
2004/0048027 A1  3/2004 Hayes et al.

FOREIGN PATENT DOCUMENTS

DE    102005023473 A1   11/2006
JP    H10180882 A        7/1998
(Continued)

OTHER PUBLICATIONS

Melchels et al. ("Mathematically defined tissue engineering scaffold architectures prepared by stereolithography", Biomaterials 31 (2010) pp. 6909-6916 Jun. 2010). (Year: 2010).*
(Continued)

*Primary Examiner* — Weiping Zhu
(74) *Attorney, Agent, or Firm* — Laurence A. Greenberg; Werner H. Stemer; Ralph E. Locher

(57) ABSTRACT

Method of manufacturing a three-dimensional object of a building material by an additive layer-wise building method, wherein based on material parameters of the building material and predetermined characteristics of the object to be manufactured, an internal structure of the object having a grid structure calculated, and the three-dimensional object is
(Continued)

manufactured with this internal structure by the additive layer-wise building method, so that it comprises the predetermined characteristics.

20 Claims, 3 Drawing Sheets

(51) Int. Cl.
*B29C 64/153* (2017.01)
*B29C 64/20* (2017.01)
*B33Y 70/00* (2015.01)
*B33Y 50/02* (2015.01)
*B33Y 10/00* (2015.01)
*B33Y 80/00* (2015.01)
*B29L 31/50* (2006.01)
*B29L 31/00* (2006.01)

(52) U.S. Cl.
CPC ............ *B29K 2995/0082* (2013.01); *B29K 2995/0091* (2013.01); *B29L 2031/504* (2013.01); *B29L 2031/721* (2013.01); *B33Y 10/00* (2014.12); *B33Y 50/02* (2014.12); *B33Y 70/00* (2014.12); *B33Y 80/00* (2014.12)

(58) Field of Classification Search
USPC ........................................ 419/61
See application file for complete search history.

(56) References Cited

FOREIGN PATENT DOCUMENTS

| JP | H1142713 A | 2/1999 |
| JP | 2009029064 A | 2/2009 |
| WO | 0114127 A1 | 3/2001 |
| WO | 2004022319 A1 | 3/2004 |
| WO | 2006122832 A2 | 11/2006 |

OTHER PUBLICATIONS

Bonke et al., " Automatisierte Strukturgenerierung durch innovative Softwarekonzepte", [Automated structure generation by means of innovative software concepts], Additive Fertigung—Von Prototyp zur Serie, Fachtagung, D. Drummer (Ed.), Erlangen, Germany, 2009, pp. 151-161.

Murr et al., "Next-generation biomedical implants using additive manufacturing of complex, cellular and functional mesh arrays", Philosophical Transactions, The Royal Society A (2010) 368, 1999-2032, downloaded from http://rsta.royalsocietypublising.org/ on Jan. 18, 2017.

Melchels et al., "Mathematically defined tissue engineering scaffold architectures prepared by stereolithography", Biomaterials 31 (2010) pp. 6909-6916, Jun. 26, 2010.

* cited by examiner

METHOD OF MANUFACTURING A THREE-DIMENSIONAL OBJECT HAVING AN INTERNAL STRUCTURE

BACKGROUND OF THE INVENTION

Field of the Invention

The invention relates to a method of manufacturing a three-dimensional object having an internal structure for creating a predetermined characteristic of the object. In particular, the invention relates to manufacturing a three-dimensional object being flexible in at least one portion of a powdery material by means of laser sintering, mask sintering or another layerwise building method.

There are elastomer powders for laser sintering, by which a flexible part having rubber-like characteristics can be manufactured. However, the application area of such a sinter powder is restricted.

Further, it is known from DE 10 2005 023 473 A1 to manufacture shoe soles with portions which are partly resilient by rapid prototyping, for example by laser sintering.

A. Bonke and C. Fruth describe in their article "Automatisierte Strukturgenerierung durch innovative Softwarekonzepte" in the publication "Additive Fertigung— vom Prototyp zur Serie", Fachtagung, Hrsg. D. Drummer, Erlangen 2009, pp. 151-161 the use of structures when building objects by means of an additive manufacturing method. The key focus is on obtaining objects that have a lower weight through the use of grid structures due to the fact that not the whole body volume has to be formed from massive material.

BRIEF SUMMARY OF THE INVENTION

It is the object of the invention to provide a method of manufacturing a three-dimensional object, by which three-dimensional objects having different component characteristics can be generated by a predetermined building material.

This object is achieved by a method according to the patent claim. Further developments of the invention are defined in the dependent claims.

According to the invention given material properties of a building material are taken into consideration when calculating grid structures, by which desired properties of an object are implemented. For this reason it is possible to generate objects from "artificial" or "fictive" materials:

From a building material having preferred properties (e.g. capability of resistance or durability) objects may be manufactured that have mechanical properties (e.g. elasticity), which would not be obtained when constructing these objects as massive objects. Thus, a body that has been generated has properties, which would have been obtained, if said body was massively formed out of a fictive material having the desired combination of properties (e.g. capability of resistance and elasticity).

Specifically, the method has the advantage that flexible objects can be manufactured only by the building style on the basis of the internal structure with a raw material having relative high modulus of elasticity. Thereby, the options for the material are remarkably larger as compared to the use of elastomer powders.

Further, the method has the advantage that within a building process, objects with different mechanical characteristics, for example different rigidities, can be manufactured with one and the same material. Moreover, an object can be created by one and the same material within one building process with locally different characteristics, for example locally different rigidities.

Thereby, a large plurality of objects can be manufactured, in particular objects of a desired material having predetermined characteristics can be manufactured "on demand". Thus, objects may be manufactured, which show completely new combinations of properties.

Further features and aims of the inventive step are obvious from the description of embodiments on the basis of the figures.

DESCRIPTION OF THE INVENTION

Figure 1:
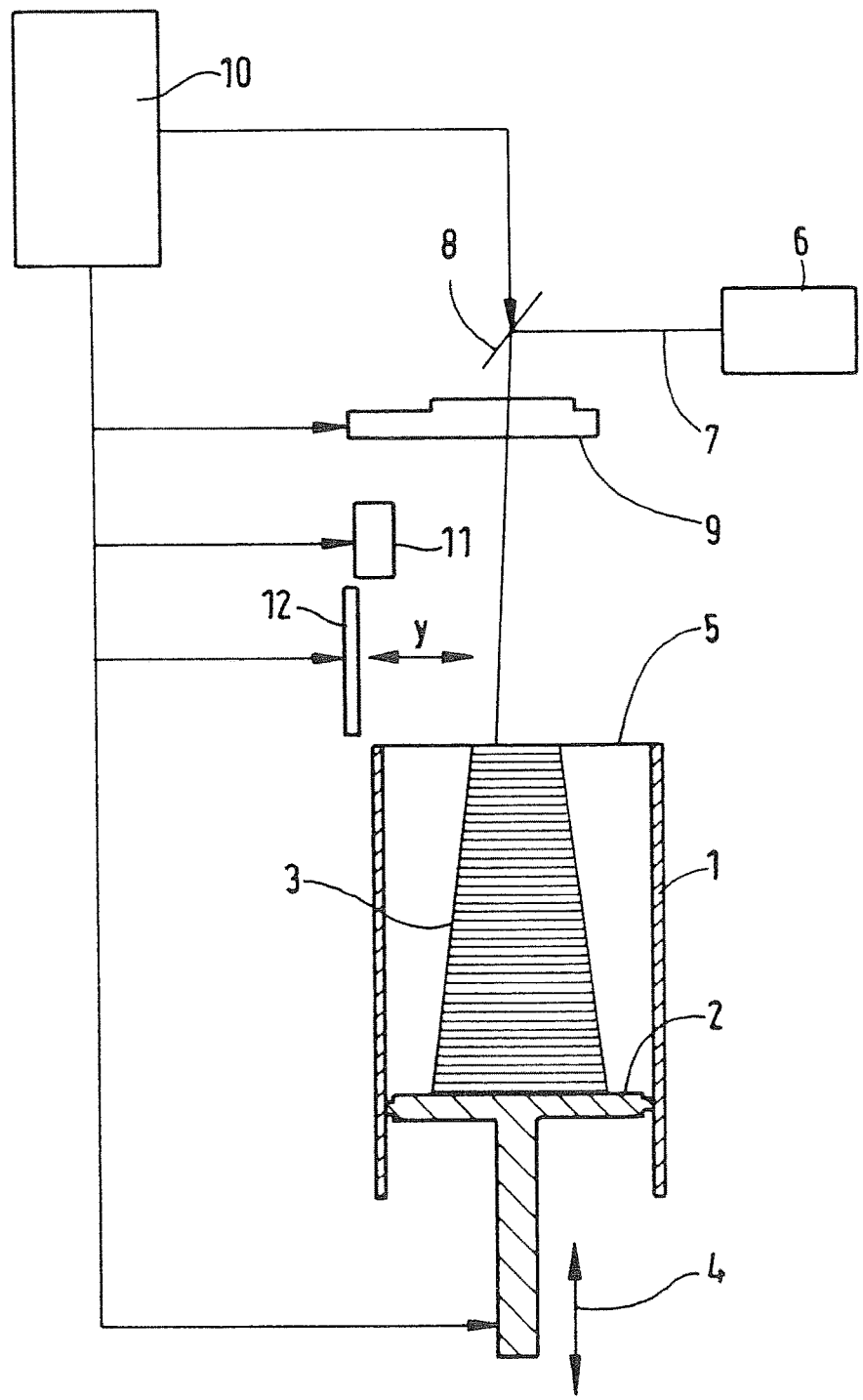
FIG. 1 a schematic view of a laser sintering machine.

In the following, the method according to the invention is described with reference to the laser sintering method and an example of a laser sintering device according to FIG. 1.

The device comprises a building container 1, in which a support 2 for supporting an object 3 to be built is provided. The support 2 is moveable in a vertical direction within the building container by a height adjusting means 4. The plane, in which the applied powdery building material is to be solidified, defines a working plane 5. For solidification of the powdery material in the working plane 5, a laser 6 is provided which generates a laser beam 7 focussed on the working plane 5 by a deflection means 8 and, if necessary, by a focussing unit 9. A control device 10 is provided, which controls the deflection means 8 and, if necessary, the focussing unit 9 such that the laser beam 7 can be deflected to any arbitrary point in the working plane 5. The control device 10 is controlled by data containing the structure of the object to be manufactured. The data contain data of the object in each layer to be solidified.

Further, a supplying device 11 is provided, by which the powdery building material can be supplied for a subsequent layer. By means of an applicator 12, the building material is applied in the working plane 5 and smoothened.

During operation, the support 2 is lowered layer by layer, a new powder layer is applied and solidified by the laser beam 7 at locations corresponding to the respective object in the respective layers in the working plane 5.

As powdery building material, all powders or powder mixtures can be used which are suitable for the laser sintering method. Such powders include for example synthetic powder such as polyamide or polysterene (PAEK, polyarile-ether-amide), elastomere such as PEBA (polyether-block-amide), metal powders such as stainless steel powders or other metal powders which are adapted to the respective purpose, in particular alloys, synthetic-coated sand or ceramic powders.

According to the method of the invention, an internal structure of the object is calculated on the basis of material parameters of the used building material and predetermined characteristics of the object to be manufactured, and the three-dimensional object is manufactured layer by layer with this internal structure, so that it comprises the predetermined characteristics after manufacturing it. As a result, a body that has been generated from the building material has for example properties that correspond to the desired properties of a body of identical shape and volume from a different material, wherein, however, these desired properties are combined with other advantageous properties of the building material that has been actually used. As material parameter of the building material, one can see at least the modulus of elasticity. However, also further material parameters can be used as value in the calculation, for example the tensile strength, the hardness, the density, the breaking strain, the Poisson ratio (Poisson's number), etc. In the embodiment, a powder having a relative high modulus of elasticity of about 50 MPa is used as the building material.

Next, the mechanical characteristic of the object to be manufactured, in the embodiment the rigidity of the object to be manufactured, is determined by impact of a pre-defined pressure force in a predetermined direction. Further mechanical characteristics, for example rigidities in different directions, tensile strength, breaking strain by tensile load, Poisson ratio, torsion behaviour, fatigue behaviour etc. can be determined.

On the basis of the modulus of elasticity of the building material and the at least one predetermined characteristic of the object to be manufactured, a three-dimensional grid structure is calculated. The three-dimensional grid structure provides the locations, at which the powdery building material is solidified by impact of the laser beam. In the cavities therebetween, the powder is left un-solidified. The three-dimensional object is then built-up layer by layer in accordance to the calculated grid structure. Preferably, the grid extends to the peripheral areas of each layer, so that the manufactured object completely consists of the grid structure without any completely closed surface. Thereby, it is possible to easily remove the non-solidified powdery material after the manufacturing process. Alternatively, the whole outline or portions of the outline of each layer can be solidified. In this case, the resulting outline of the object is either completely or partly closed. The outline, which forms an envelope, can be designed such that it absorbs deformations, for example, it can be formed as a bellows-like structure or as parts which engage each other and are moveable relative to each other. If necessary, openings for removing the not-fixed powdery material can be provided during sintering or thereafter.

Figure 2A:
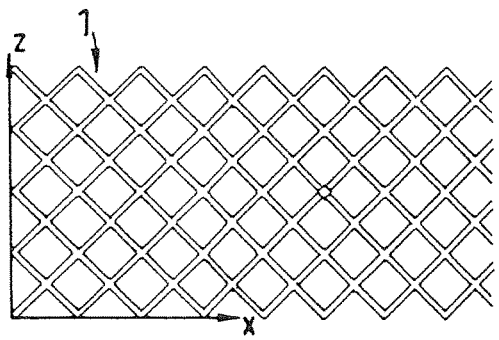
FIGS. 2a) and 2b) a schematic two-dimensional view of a cuboid having a grid structure without and with impact of a force F acting on the surface.
Figure 2B:
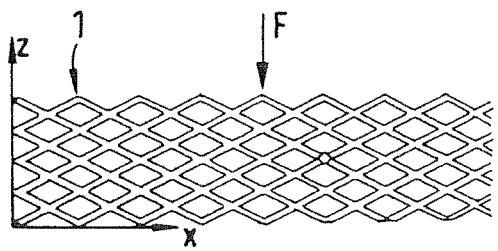
Figure 3A:
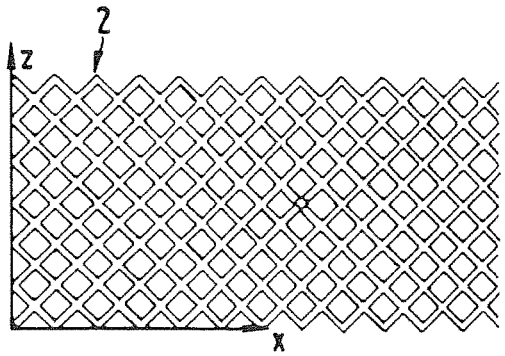
FIGS. 3a) and 3b) a schematic two-dimensional view of a cuboid like in FIGS. 2a) and 2b) having, compared with FIGS. 2a) and 2b), a narrowed grid structure without and with impact of the same force F acting on the surface.
Figure 3B:
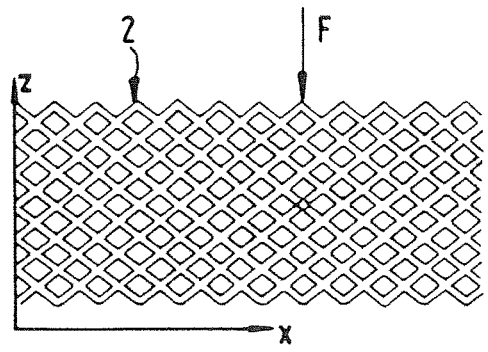

FIG. 2a shows a schematic two-dimensional view of a cuboid 1 having a first grid structure. FIG. 2b shows a schematic two-dimensional view of the cuboid of FIG. 2a, which has been compressed in a predetermined amount by impact of a force F acting over the whole surface. FIG. 3a shows a schematic two-dimensional view of a cuboid 2 having the same dimensions like in FIG. 2a with a second grid structure having a smaller grid pitch. FIG. 3b shows a schematic two-dimensional view of the cuboid of FIG. 3a by impact of a force F having the same amount like in FIG. 2b, which in turn acts on the whole surface and thus compresses the body. The rigidity of the cuboid having the narrowed grid structure according to FIG. 3b) is larger than that of FIG. 2b).

For example, the grid structure can be a diamond grid, but also any arbitrary other grid can be used. The dimensions of the unit cell of the grid can vary, and they are typically in a range of a few millimeters for a lateral length of the unit cell. The thickness of the grid bars is in a range of about 0.1 to 2 mm. In particular cases, for example for very large parts or for rectangle or similar grid cross sections, which have a considerable larger dimension in one direction than in another direction, the thickness of the grid bars can also be in a centimeter range. By variation of the dimension of the unit cell and the thickness of the single grid bars, the desired rigidity of the object to be manufactured can be varied in a stepless manner.

Figure 4A:
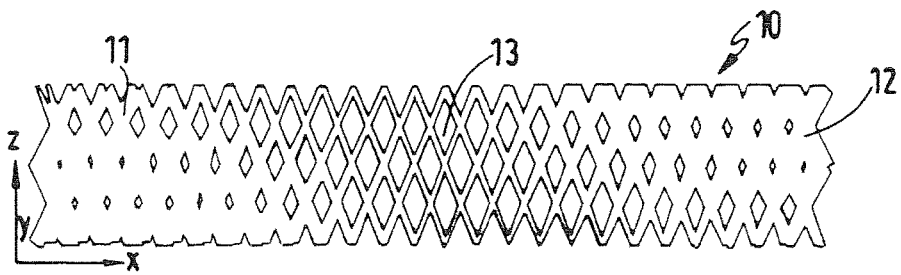
FIG. 4a a schematic two-dimensional view of a cuboid having different grid structures within the body.
Figure 4B:
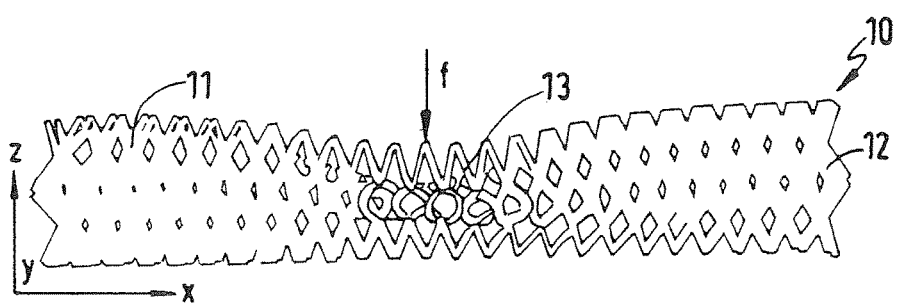
FIG. 4b a schematic two-dimensional view of the cuboid of FIG. 4a with impact of a force F.

In a further development of the method, the grid can be varied within in the object to be manufactured, so that in accordance to the direction and the load, different characteristics of the object to be manufactured can be created. For example, as it can be gathered from FIGS. 4a and 4b, a body 10 may comprise portions 11, 12 having a grid structure, which differs from a central portion 13 in that the central portion 13 is more resilient than the portions 11, 12 by impact of a pressure force f, as shown in FIG. 4b. The grid structures 11, 13, 12 as shown in FIGS. 4a and 4b continuously merge to each other.

Figure 5:
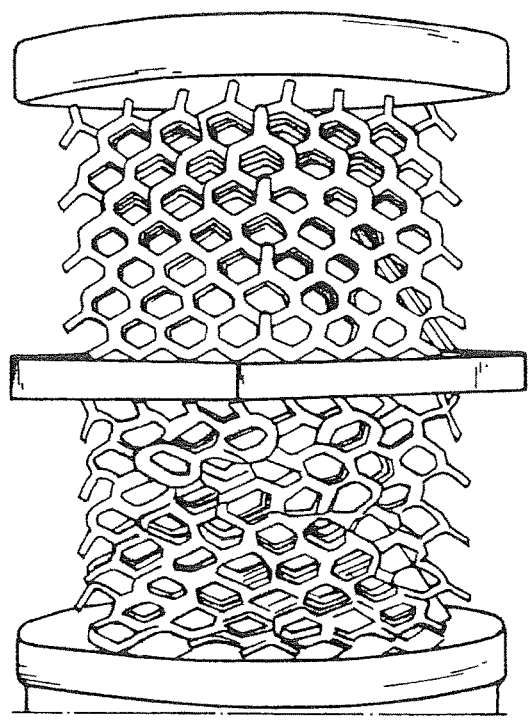
FIG. 5 a view of two laser sintered bodies separated by a partitioning plate with different internal grid structures without force impact.
Figure 6:
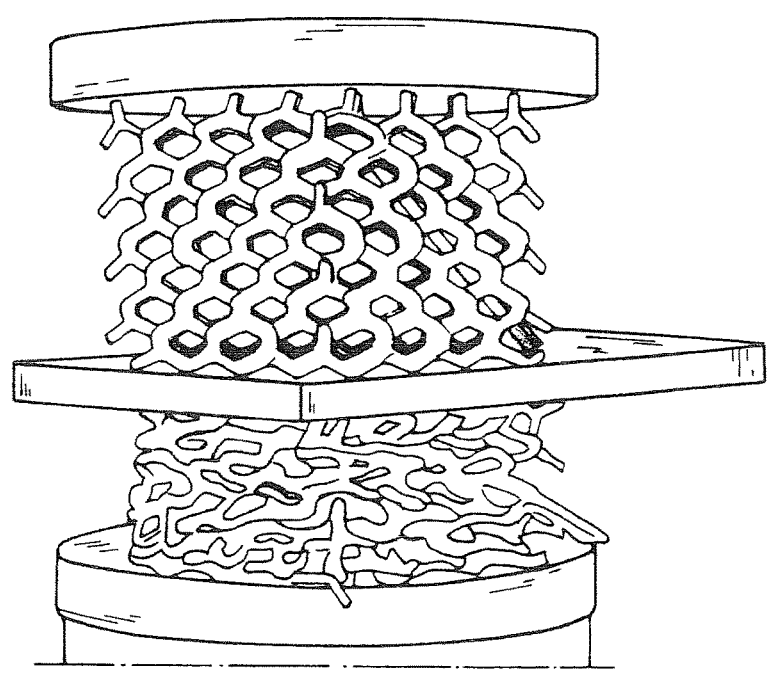
FIG. 6 a view of the laser sintered bodies of FIG. 5, which are separated by a partitioning plate, with different grid structures showing differently strong deformations by impact of a force.

FIGS. 5 and 6 show two laser sintered bodies of PEBA (poly-ether-block-amide) having different internal grid structures, wherein the bodies are separated by a partition plate. FIG. 5 shows the bodies without force impact, and FIG. 6 shows the bodies with force impact. Due to the different internal grid structures, there are differently strong deformations. The lower body is stronger deformed than the upper body.

In a further development, the object to be manufactured can, also with respect to its rigidity, not only show a linear behaviour, but also be formed non-linear. This can be realized by provision of stops, for example, wherein a stop is formed by a rigid portion in the object. For example, a rigid portion can be created by an area which is partly sintered or completely sintered at the surface.

In a further development, the degree of solidification of the grid structure can additionally be varied.

In a further development, a predetermined breaking point can be created by variation of the grid structure within a body.

By the method, all types of flexible objects can be manufactured, for example dampers, insert soles, protection cushions, etc.

The invention is not restricted to laser sintering. It can be used for all generative methods, where a body is layerwise manufactured of a building material, for example stereolithography, which uses a liquid light-curing resin instead of a powdery material, the three-dimensional printing, where the powdery building material is solidified by a binder which can be applied in the shape of droplets onto the powder layer, for example, or also the selective mask sintering, where a mask and an expanded light source are used instead of a laser beam.

The invention claimed is:

1. Method of manufacturing a flexible three- dimensional object of a building material by an additive layerwise building method, the method comprising the following steps:

based on material parameters of the building material and predetermined characteristics of the object to be manufactured:

calculating an internal structure of the object including a grid structure to yield a flexible object having a modulus of elasticity E2 where the building material has a modulus of elasticity E1, wherein E1>E2, and the object has areas formed of grid structures of different flexibility characteristics smoothly transitioning from one area to another, providing the object with a final shape being elastically and resiliently compressible and expansible by an external force and returning to the final shape upon removing the force and E2 being calculated at locations of each area of different flexibility, and manufacturing the three-dimensional object as a single integrated piece having this internal structure by the additive layerwise building method.

2. Method according to claim 1, wherein, as material parameter of the building material, the modulus of elasticity and/or the tensile strength and/or the hardness and/or the density and/or the breaking strain and/or the Poisson ratio and further material parameters, and as the characteristic of the object, the rigidity and/or the tensile strength and/or the breaking strain at tensile load and/or the Poisson ratio and/or the torsion behavior and/or the fatigue behavior and/or further characteristics of the object by impact of a predetermined force are used.

3. Method according to claim 1, wherein the outline of the grid structure is either left open or completely or partly closed by an envelope.

4. Method according to claim 1, wherein in the outline of the grid structure, openings are present for removal of residual material.

5. Method according to claim 1, wherein the flexibility is varied by varying the degree of solidification of a plastic material.

6. Method according to claim 1, wherein the structure within the object is varied such that different characteristics in accordance to the direction and/or the load are created.

7. Method according to claim 1, wherein objects having different mechanical characteristics are manufactured by one and the same raw material.

8. Method according to claim 1, wherein powdery building material is used as the building material.

9. Method according to claim 8, wherein the additive layerwise building method is a laser sintering method.

10. Method according to claim 8, wherein the additive layerwise building method is a mask sintering method.

11. Method according to claim 1, wherein the flexibility varies at the boundary of two neighboring areas in a stepless continuous manner.

12. A method of manufacturing a three-dimensional object having physical flexibility by an additive layerwise building method, the method comprising the following steps:

providing a system being capable of a generative, layerwise, additive manufacture of objects;

providing at least one kind of building material for use in the system to make at least one object having physical resilience and flexibility; and creating a grid structure for the object, the grid and the entire object being formed in a single integral piece with variations formed in the grid structure creating areas of different mechanical flexibility characteristics for the object and in a manner allowing the object to resiliently change in shape in one or more dimensions from a finished state, the areas of different mechanical flexibility transitioning from one to another in the object.

13. The method according to claim 12, wherein the building material has a modulus of elasticity of E1 in a pre-method condition, and the resulting object from the method has as a whole a modulus of elasticity of E2 and E1>E2.

14. The method according to claim 12, wherein the system is an SLS system using a powder building material.

15. The method according to claim 14, wherein a single kind of building material is used in the method.

16. The method according to claim 12, wherein the force is one or more of a compression, expansion or torsional force.

17. The method according to claim 12, further including the step of forming a flexible envelope about an exterior of the grid structure, wherein the internal grid structure is thereby enclosed within the flexible envelope being formed integral with the grid structure.

18. The method according to claim 17, wherein the enclosed grid structure contains unsolidified building material therein.

19. The method according to claim 12, further including the steps of:

forming at least two flexible areas of the object, the flexible areas having different rates of resisting the force applied thereto in use; and forming at least one substantially inflexible region separating the at least two flexible areas of the object, causing the object to acquire a non-linear flexibility across the at least one substantially inflexible region.

20. The method according to claim 12, wherein the variations in the grid structure are formed in a stepless manner by varying the degree of solidification of a plastic, non-metal, powder material.

* * * * *